United States Patent Office 3,556,804
Patented Jan. 19, 1971

3,556,804
REDUCTION OF MIXING REQUIREMENTS FOR YEAST LEAVENED BREAD DOUGH
James F. Conn, St. Louis, and Thomas P. Kichline, Chesterfield, Mo., assignors to Monsanto Company, St. Louis, Mo., a corporation of Delaware
No Drawing. Continuation-in-part of application Ser. No. 617,503, Feb. 21, 1967. This application Aug. 11, 1969, Ser. No. 849,154
Int. Cl. A21d 2/14
U.S. Cl. 99—90
16 Claims

ABSTRACT OF THE DISCLOSURE

Unsaturated aliphatic and cyclic alcohols, having from 3 to about 12 carbon atoms and containing at least one vinylene, carboxy substituted vinylene or ethylene group, reduce the mixing requirements for yeast leavened bread dough produced from wheat flour. Addition of ammonium salts together with the unsaturated alcohols produces bread of improved shelf life.

This application is a continuation in part of application Ser. No. 617,503, filed Feb. 21, 1967, now abandoned.

This invention relates, in general, to yeast leavened bread containing wheat flour. More particularly, it relates to improvements in the production of bread, novel bread additives and flour compositions containing the novel bread additives.

Although various "breads" are made, bread, as used herein, refers to yeast-leavened bread produced with wheat flour. One of the major problems which has heretofore faced the manufacturers of bread is the high mixing requirements necessary to produce a good quality bread. In the continuous process for producing bread, a liquid brew is prepared from some of the conventional breadmaking ingredients including yeast, yeast food, sugar, wheat flour and other optional bread making ingredients. A major portion of the fermentation (which aided in developing the cell structure in the older "conventional" process for bread) occurs in the brew. This "development" is achieved in the continuous production of bread by high speed mixers. These mixers "develop" the bread after the brew is mixed together with the other breadmaking ingredients which include shortening, emulsifiers, oxidants and the rest of the wheat flour. To achieve a good quality bread, it is usually necessary, when flour produced from certain types of wheat are used, to either mix the ingredients for prolonged periods of time or to supply extremely high energy requirements in order to develop good quality bread. In many continuous processes the mixing step is the bottleneck.

In the batch or conventional process several ingredients such as water, yeast, yeast food, salt, sugar, malt, milk solids, shortening, buffering agents and oxidants are combined with the flour to thereby form a dough. Fermentation starts during initial mixing and continues up to a relatively short time before the bread is completely baked. In many instances the "sponge and dough" method is used commercially. In this method, part of the ingredients are mixed together to form a "sponge" and after about 3 to 5 hours, the remaining flour, milk solids, shortening, sugar and other ingredients are added. A degree of dough development occurs at this stage and also mixing requirements are relatively high because of the viscous mixture. A reduction in mixing requirement would be beneficial in many instances because the mixing step is the bottleneck in many commercial bakeries using the batch method. Also, if the mixing step is not the bottleneck, the reduced mixing requirement enables a sizeable decrease in power input thus reducing power costs.

An additional problem with all bread, regardless of the process used for producing it, is "shelf-life" or the tendency of the bread to lose its softness over a period of time.

Various additives have been used to overcome the problems associated with high mixing requirements and shelf-life. None of these additives are believed to be completely satisfactory because they introduce other problems into the production of bread. For example, glutathione and cysteine reportedly reduce the mixing requirements of bread; however, if they are used in amounts required to effectively reduce mixing requirements of bread dough, additional oxidants such as potassium iodate and potassium bromate must be used at or above the maximum level established by the Federal Drug Administration in order to achieve good quality bread and can cause bad flavors. Certain emulsifiers such as the mono-, diglycerides have been used to improve shelf-life. The compounds, however, are relatively expensive and are difficult to prepare. It is believed, therefore, a novel, relatively inexpensive, bread additive which not only reduces mixing requirements in the continuous production of yeast leavened bread but also improves the quality of the bread produced and which is a suitable yeast food would be a significant advancement in the art.

In accordance with this invention it has been discovered that compositions comprising certain unsaturated compounds of a class to be hereinafter described reduce the mixing requirements in the development of bread. Bread additives containing the unsaturated compounds and certain ammonium salts have been found to improve the shelf-life of the bread.

The compounds which have been found to reduce the mixing requirement of bread made from wheat flour are, in general, cyclohexyl alcohols and aliphatic unsaturated alcohols, containing at least one vinylene

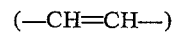

or ethylene (—C≡C—) group. More particularly, the unsaturated alcohols which have been found useful in the reduction of the mixing time of bread dough are compounds selected from the group consisting of (1) cyclohexyl monohydroxy alcohols, (2) cyclohexyl dihydroxy alcohols and (3) alcohols having the formula:

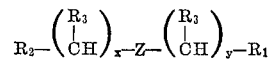

wherein Z is selected from the group consisting of —CH=CH—, —C≡C—, x and y are each from 0 to 8, x+y is from 0 to 8, and $R_1$ is selected from the group consisting of —CH$_3$ and —CH$_2$OH; and wherein $R_2$ is selected from the group consisting of $R_1$, hydrogen, univalent lower aliphatic radicals, phenyl, tolyl, and cyclohexyl, $R_3$ is selected from the group consisting of H, —OH and —CH$_3$ and wherein the total number of carbon atoms in said compounds is from 3 to about 12. Univalent lower aliphatic radicals, as used herein, mean hydrocarbon radicals containing from 1 to 4 carbon atoms which are derived from alkanes, alkenes and alkynes.

The aliphatic alcohols containing from 3 to about 12 carbon atoms which reduce the mixing requirements of bread dough are mono- and dihydroxy alcohols. It is also to be noted that the compounds can have more than one substituent and more than one unsaturated group as well as different substituents. It has also been found that, in most instances, the maximum number of carbon atoms in suitable compounds is about 12 although the length of the linear portion preferably should contain from about 3 to about 9 carbon atoms. Lower molecular weight compounds, that is those containing from 3 to about 6 carbon atoms, are more preferred since lower amounts by weight can be used to achieve a given degree of reduction in mixing requirement.

Useful unsaturated alcohols containing at least one double or triple bond between adjacent carbon atoms can also be used to reduce the mixing time or mixing requirement of bread dough. Such alcohols are represented by the formula

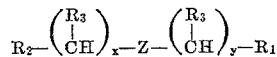

wherein $R_1$, $R_2$, $R_3$, $x$ and $y$ are each as defined hereinbefore and are the olefinic monohydric alcohols such as 2-propene-1-ol, 2-butene-1-ol, 2-pentene-1-ol, 4-methyl-2-hexene-1-ol, 2-4-hexadiene-1-ol, 2-nonene-1-ol, 3-hexene-1-ol, 2-dodecene-1-ol and 4,4-dimethyl-2-pentene-1-ol; the olefinic dihydric alcohols such as 2-pentene-1,5-diol, 2-hexene-1,6-diol, 4-methyl-2-octene-1,8-diol, and 2-hexene-1,4-diol; the ethylenic monohydric alcohols such as 2-propyne-1-ol, 3-heptyne-1-ol, 2-nonyne-1-ol, 2-dodecyne-1-ol, 3-hexyne-1-ol and 2-butyne-1-ol; and the ethylenic dihydric alcohols such as 2-butyne-1,4-diol, 2-pentyne-1,5-diol, 2-dodecyne-1,12-diol and 2-octyne-1,8-diol, the olefinic phenyl-, tolyl- and cyclo-hexyl substituted monohydric alcohols such as 3-phenyl-2-propene-1-ol, 3-p-tolyl-2-propene-1-ol and 3-cyclohexyl-2-butene-1-ol, and the ethylenic phenyl-, tolyl- and cyclo-hexyl-substituted monohydric alcohols such as 3-phenyl-2-propyne-1-ol, 3-o-tolyl-2-propyne-1-ol and 3-cyclohexyl-2-propyne-1-ol.

Of the foregoing compounds, the olefinic monohydric alcohols containing from 3 to about 8 carbon atoms, the olefinic dihydric alcohols containing from 4 to about 8 carbon atoms, the acetylinic monohydric alcohols containing from 3 to about 8 carbon atoms and the acetylinic dihydric alcohols containing from about 4 to about 8 carbon atoms are preferred. Especially preferred are the linear olefinic mono- and di-hydric alcohols containing 3 to 6 carbon atoms.

Although various methods can be used to incorporate the useful unsaturated alcohols of this invention into bread compositions prior to mixing, they may, particularly in the continuous process, be incorporated as part of a bread additive. One of the embodiments of the subject invention is to provide a bread additive which contains the unsaturated alcohols and certain ammonium salts. The bread additive provides a source of yeast food, reduces mixing requirements and improves shelf-life. Heretofore "yeast food compositions" were generally added to both conventional and continuous bread making processes. These "yeast food compositions" generally contain various ammonium and calcium salts, such as ammonium sulfate, calcium sulfate, dicalcium phosphate, monocalcium phosphate, diammonium phosphate, calcium carbonate and ammonium chloride. Other ingredients such as sodium chloride, oxidants, and fillers are added. Also, in most instances, by incorporating into a bread additive, at least some of the useful unsaturated alcohols can be added to the bread making process prior to mixing, in a convenient manner and which additive will reduce the mixing requirements, provide a source of yeast food and improve shelf-life of the bread. The bread additives of this invention contain ammonium compounds which provide nitrogen to the yeast cells and at least one of the foregoing useful unsaturated alcohols. The useful ammonium compounds are salts of the inorganic acids such as ammonium sulfate, ammonium phosphate and ammonium chloride. Thus, the composition comprising the unsaturated alcohols and the ammonium salts, one of the embodiments of this invention, as a bread additive offers a convenient method of incorporating these compounds into the bread process and thereby achieving the beneficial results, reducing the mixing time of dough, providing a yeast food and improving shelf-life of the resulting bread. The mono-ammonium or di-ammonium salts are used and of these, mono-ammonium orthophosphate is preferred. The unsaturated alcohols can be used alone and achieve the reduced mixing time.

In the formulation of bread additives utilizing the alcohols of this invention, it is generally preferred to incorporate a flow conditioner or filler to enable the compositions to remain free flowing. The most common fillers presently employed in yeast food compositions are flour and starch. Although these can be used satisfactorily in the practice of this invention, it is generally preferred to use dicalcium phosphate, calcium sulfate or tricalcium phosphate as a flow conditioner and thereby provide a source of calcium to the bread which is recognized as a valuable nutrient in bread.

It is also preferred in some instances to use, monocalcium orthophosphate (MCP) along with the unsaturated alcohols and ammonium compounds to provide a buffering action and an additional source of calcium. The amounts and proportions of monocalcium orthophosphate that will be employed will be dependent upon several factors such as the particular ingredients that are in the bread formulation. For example, if relatively high levels of nonfat dry milk, such as above about 3% by weight are used, the levels of the ammonium and calcium salts will be relatively high to achieve the proper pH in the system. In most instances, however, the bread additive will contain from about 3 to about 50% of the unsaturated alcohols; from about 3% to about 50% of the ammonium salts and the remainder of the composition will contain varying levels of monocalcium orthophosphate and the inert filler or flow conditioner to yield a composition which will yield a pH in baked bread of from about 5.1 to about 5.7 when a bread is produced from the following formulation:

| | Parts |
|---|---|
| Flour | 1000 |
| Yeast | 30 |
| Water | 650 |
| Sugar | 20 |
| Salt | 20 |
| Nonfat dry milk solids | 20 |
| Shortening | 30 |
| Potassium bromate | 0.060 |
| Potassium iodate | 0.015 |
| Bread additive (composition of this invention) | 5 |

The bread additive of this invention can contain an oxidant, such as potassium promate, potassium iodate, calcium iodate, calcium bromate and calcium peroxide, in addition to the beforementioned ammonium and calcium salts. Typical formulations, which are preferred in the practice of this invention contain an ammonium compound selected from the ammonium sulfates, ammonium chlorides and ammonium phosphates; the useful unsaturated alcohols and can contain, as desired, the following: a flow conditioner selected from the group consisting of flour, starch, dicalcium phosphate, tricalcium phosphate and calcium sulfate; monocalcium orthophosphate; salt; and an oxidant selected from the group consisting of potassium bromate, calcium bromate, potassium iodate, calcium iodate and calcium peroxide. The ranges by weight percentages of the ingredients in the bread additives are given in Table A.

TABLE A

| Ingredient: | Range (weight percent in yeast food composition) |
|---|---|
| Ammonium compound | 3 to 25 |
| Unsaturated alcohol | 3 to 35 |
| Monocalcium orthophosphate | 0 to 40 |
| Salt (NaCl) | 0 to 40 |
| Oxidant | 0 to 3 |
| Flow conditioner | 0 to 50 |

While the amount of the ingredients in the yeast food compositions can vary within the ranges given, it is preferred to formulate bread additives, which, when used in bread making in amounts of from about 0.5% to about 2.5% based upon the weight of the flour in the bread will result in amounts of oxidants in the bread of from about 0.0025 to about 0.0075% by weight, amounts of the ammonium compounds in the bread from about 0.1 to about 0.25% by weight and amounts of the useful unsaturated alcohol in the bread of from about 5 to about 30 micromoles per gram of flour and in some cases 50 micromoles per gram of flour. In most instances, the weight ratio of the useful unsaturated alcohols to the ammonium compounds will be from about 1:20 to about 20:1, respectively, with weight ratios of from about 1:10 to about 10:1, respectively, being especially preferred.

Another suitable method of incorporating the unsaturated alcohols of this invention into bread is by preparing a flour mixture containing them. As was previously mentioned, various types of flour have different mixing characteristics, therefore, if a baker is using more than one type of flour, one method to achieve optimum benefits of this invention is to add the appropriate amount of the unsaturated alcohol or the yeast food composition to the flour. If a baker used varying types of flour and each contained the amount of additive required to reduce mixing time, no problem would exist with varying quality of flour as far as mixing time or mixing requirement is concerned.

In most instances, however, with most flours, the amount of the unsaturated alcohols incorporated into the bread is relatively low, that is, less than about 0.8% by weight based upon the flour that is used. Since no adverse effects result from the use of more of the unsaturated alcohols than is required to give a significant reduction of mixing time, the higher levels can be used satisfactorily. The baker, therefore, can incorporate the compositions in the amount required to significantly reduce mixing time of the most difficult flour without adverse effects upon the quality of the bread.

As previously mentioned, the amount of the unsaturated alcohols necessary to achieve a significant reduction in mixing time of the dough is relatively low, that is, amounts as low as about 0.005% based upon the weight of flour yield a measurable reduction in mixing requirements. In most instances, however, larger amounts will be used, such as from about 0.05% to about 0.8%, although amounts up to about 1.0% by weight based upon the flour can be used. In some instances, the amount will be from about 0.05% to about 0.3% by weight. Amounts of the ammonium salts of inorganic acids along with unsaturated alcohols that have been found to yield improved shelf-life generally range from about 0.005% to about 0.5% by weight based upon the flour used. The compositions of this invention containing the ammonium salts and the unsaturated alcohols will usually be incorporated in the flour in amounts so as to yield from about 5 to about 30, and in some instances 50, microgram moles of the unsaturated compounds per gram of flour and from about 5 to about 35 microgram moles of the ammonium compounds per gram of flour.

To more fully illustrate the subject invention, the following detailed examples are presented. All parts, percentages and proportions are by weight unless otherwise indicated.

EXAMPLE I

The Brabender Farinograph is used by the baking industry to predict the mixing requirement for the production of bread utilizing a wheat flour. Certain measurements on a sample of a flour and water mixture correlates well with the actual mixing requirements in the production of bread; also any additive which is used with the flour and water mixture which lowers the mixing requirement as tested by the Brabender Farinograph will also lower the mixing requirements. They are the time required to reach maximum resistance (peak time) and the time required for the resistance to reach a peak and then drop 30 units on the Farinograph (time to breakdown).

Samples of flour and water and with various additives are tested. The amount of additives used in each case is 10 micromoles per gram of flour. The procedure used in Method No. 54-21 Cereal Laboratories Method 7th ed. American Association of Cereal Chemists, St. Paul, Minn., modified, however, by raising the r.p.m. of the mixer from 63 to 104 and conducting the test at 40° C. instead of 30° C. The higher temperature and r.p.m. correspond more closely with continuous process conditions. Three samples are prepared and tested for "peak time" and for "time to breakdown." In each instance, the flour used is produced from a hard red winter wheat having a protein content of 11.8%, ash content of 0.41% and moisture content of 13.06%. Table 1 gives the results of these tests.

TABLE I

| Sample | Additive | Peak time | Time to breakdown |
|---|---|---|---|
| 1 | Control (no additive) | 10 | 11.8 |
| 2 | 2-propyne-1-ol | 5.2 | 6.1 |
| 3 | 2-propene-1-ol | 6.7 | 7.8 |
| 4 | 2-butene-1-ol | 9.3 | 11.6 |
| 5 | 4-pentene-2-ol | 6.4 | 6.9 |

The results of the above tests indicate that unsaturated alcohols which have a double bond between two adjacent carbon atoms are effective in reducing mixing time and at low levels of usage.

It is also believed that the above tests indicate that linear compounds containing from 3 to about 6 carbon atoms are more effective even on a molar equivalent basis. Because of their lower molecular weight, these preferred compounds are much more efficient on a weight basis.

Substantially similar results are obtained by substituting substantially molar equivalent amounts of similar alcohols for the alcohols of this example.

EXAMPLE II

Using the procedure in Example I, the unsaturated additives are tested to determine their effect upon the mixing requirement of flour. All conditions are the same as in Example I except varying quantities of additives were used. Table 2 gives the results of these tests.

TABLE 2

| Sample | Additive | Amount used [1] | Peak time | Time to breakdown |
|---|---|---|---|---|
| 1 | None | | 10.0 | 11.8 |
| 2 | 2-propene-1-ol | .06 | 6.7 | 7.8 |
| 3 | 2-propyne-1-ol | .05 | 5.2 | 6.1 |

[1] Parts/100 parts of flour.

The results of the above tests indicate that the unsaturated alcohols decrease the mixing time of flour.

EXAMPLE III

To determine in the laboratory whether an additive has an effect upon dough and bread characteristics in a batch bread process, the American Association Cereal Chemists Method No. 10-11 is used. See Cereal Laboratory Methods, A.A.C.C., St. Paul, Minn., 7th ed. (1962). In tests on various alcohols, this method is used with 3 modifications. The amount of sugar is increased from 5 to 7%, 3% nonfat dry milk is used and a 50/50 blend of two commercial yeast foods is used in the doughs instead of the yeast foods given in A.A.C.C. Method No. 10-11. The blend of commercial yeast foods used has the following composition: 25% monocalcium phosphate, 35% ammonium sulphate, 0.05% potassium iodate, 0.20% potassium bromate, 31.4% starch, 22.5% NaCl, 12.5% calcium sulfate and 4.85% ammonium chloride.

The alcohol of this invention is used at a level of about 0.15% based upon the flour used in the formulation. The mixer speed used is 198 r.p.m. For the control without the alcohol of this invention, the mixing time for optimum development is 12 minutes as compared to 6 minutes in the bread containing the alcohol of this invention.

EXAMPLE IV

In this example, bread is made using the continuous process with a two-stage brew preparation. In the first stage, about 400 parts of flour, about 30 parts of yeast, about 3 parts 2-butene-1-ol, and about 650 parts of water are added to an agitated heated vessel. After the brew is heated to about 85° F. to about 90° F. for about 45 minutes, an additional 100 parts of flour, about 20 parts of sugar, about 20 parts of salt, about 30 parts of nonfat dry milk solids and 1 part of mold inhibitor are added. After the latter ingredients are added, the brew is agitated and held at about 85° F. to 90° F. for about an additional 105 minutes after which the brew is transferred to an incorporator where about 500 parts of flour, about 30 parts of shortening, about 40 parts of sugar, about 0.06 part of potassium bromate and about 0.015 part of potassium iodate are added and mixed to form a premixed dough. After a dough is formed, it is transferred to a high speed mixer, where the dough is developed by a high degree of mixing for about 40 seconds. After the dough is developed in the high speed mixer, it is divided and panned. The bread is proofed for about 60 minutes in a chamber wherein the temperature is controlled at about 100° F. at 95% relative humidity. After the proofing time, the bread is placed in the oven and allowed to bake for about 18 minutes at about 450° F.

The bread has good volume, and excellent grain texture, crumb, and color characteristics and is suitable for commercial sale. Other comparable breads can be produced in the same manner as described above by replacing 2-butene-1-ol with substantially molecular equivalent amounts of 4-pentene-2-ol or 2-propene-1-ol.

EXAMPLE V

In this exaple, bread is produced by the conventional method. About 650 parts of flour produced from hard red winter wheat, about 25 parts of yeast, about 5 parts of yeast food containing oxidants, about 10 parts 4-pentene-2-ol and about 390 parts of water are mixed together to form a sponge. The sponge is allowed to ferment for about 3½ hours after which about 350 parts of flour, about 250 parts of water, about 30 parts of nonfat dry milk solids, about 30 parts of shortening, about 20 parts of sugar, about 20 parts of salt and about 1.5 parts of mold inhibitor are blended together with the sponge in a relatively low speed mixer for about 3.0 to about 5.0 minutes to form a "developed" dough. The dough is allowed to relax for about 30 minutes then is divided into loaves, rounded, rested for about 15 minutes, molded, placed into pans, allowed to proof for about 60 minutes, and then baked for about 25 minutes at about 430° F.

A commercially acceptable bread with suitable qualities of texture, grain and volume is produced by following the beforementioned process. Comparable results can be achieved in similar processes by allowing the bread to relax from about 30 minutes to about 90 minutes. Also other breads can be prepared in the same manner as described above by replacing the 4-pentene-2-ol alcohol with stoichiometrically equivalent amounts of 2-butene-1-ol, and 2-propene-1-ol.

What is claimed is:
1. In a method for making yeast leavened bread from wheat flour wherein the bread dough is formed by mixing together bread making ingredients thereafter the dough is cut, proofed and baked to form bread, the improvement comprising incorporating prior to mixing, at least about 0.005 part per 100 parts of wheat flour of an unsaturated compound selected from the group consisting of (1) cyclohexenyl monohydroxy alcohols, (2) cycyohexenyl dihydroxy alcohols, and (3) alcohols having the formula

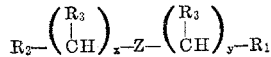

wherein Z is selected from the group consisting of —CH=CH—, and —C≡C—, x and y are each from 0 to 8, x+y is from 0 to 8, $R_1$ is selected from the group consisting of —$CH_3$ and —$CH_2$—OH, and $R_2$ is selected from the group consisting of $R_1$, hydrogen, univalent lower aliphatic hydrocarbon radicals, phenyl, tolyl, and cyclohexyl, $R_3$ is selected from the group consisting of —H, —OH, and —$CH_3$, and wherein the total number of —OH groups in said compound is from 1 to 2 and the total number of carbon atoms in said compound is from 3 to about 9.

2. A method according to claim 1 wherein the unsaturated compound is represented by said formula.

3. A method according to claim 2 wherein x+y is equal to 0 to 3 and wherein the compound is linear.

4. A method according to claim 3 wherein $R_2$ is selected from the group consisting of hydrogen and univalent lower aliphatic hydrocarbon radicals.

5. A method according to claim 4 wherein said unsaturated compound is present in an amount from about 0.05 to about 0.6 part per 100 parts of said flour.

6. A method according to claim 5 wherein said unsaturated compound is selected from the group consisting of 2-propene-1-ol, 2-propyne-1-ol, 2-butene-1-ol and 4-pentene-2-ol.

7. A flour composition comprising a major proportion of flour and as a mixing improvement agent from about 0.005% to about 0.5% of an unsaturated compound selected from the group consisting of (1) cyclohexyl monohydroxy alcohols, (2) cyclohexyl dihydroxy alcohols, and (3) alcohols having the formula

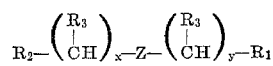

wherein Z is selected from the group consisting of —CH=CH—, and —C≡C—, x and y are each from 0 to 8, x+y is from 0 to 8, $R_1$ is selected from the group consisting of —$CH_3$ and —$CH_2$—OH, and $R_2$ is selected from the group consisting of $R_1$, hydrogen, univalent lower aliphatic hydrocarbon radicals, phenyl, tolyl, and cyclohexyl, $R_3$ is selected from the group consisting of —H, —OH, and —$CH_3$, and wherein the total number of —OH groups in said compound is from 1 to 2 and the total number of carbon atoms in said compound is from 3 to about 9.

8. A composition according to claim 7 wherein the unsaturated compound is represented by said formula.

9. A composition according to claim 8 wherein x+y is equal to 0 to 3 and wherein the compound is linear.

10. A composition according to claim 9 wherein $R_2$ is selected from the group consisting of hydrogen and univalent lower aliphatic radicals.

11. A composition according to claim 10 wherein said compound is 2-propene-1-ol, 2-propyne-1-ol, 2-butene-1-ol and 4-pentene-2-ol.

12. A bread additive composition comprising from about 3 to about 50% of an inorganic ammonium salt selected from the group consisting of ammonium salts of hydrochloric acid, ammonium salts of sulfuric acid and ammonium salts of phosphoric acid and from about 3 to about 50% by weight of an unsaturated compound selected from the group consisting of (1) cyclohexenyl monohydroxy alcohols, (2) cyclohexenyl dihydroxy alcohols, and (3) alcohols having the formula

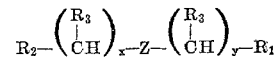

wherein Z is selected from the group consisting of —CH=CH—, and —C≡C—, x and y are each from 0 to 8, x+y is from 0 to 8, $R_1$ is selected from the group consisting of —$CH_3$ and —$CH_2$—OH, and $R_2$ is selected from the group consisting of $R_1$, hydrogen, univalent lower aliphatic hydrocarbon radicals, phenyl, tolyl, and cyclohexyl, $R_3$ is selected from the group consisting of —H, —OH, and —$CH_3$ and wherein the total number of —OH groups in said compound is from 1 to 2 and the total number of carbon atoms in said compound is from about 3 to about 9.

13. A composition according to claim 12 wherein the unsaturated compound is represented by said formula.

14. A composition according to claim 13 wherein $x+y$ is equal to 0 to 3, and wherein the compound is linear.

15. A composition according to claim 14 wherein $R_2$ is selected from the group consisting of hydrogen and univalent lower aliphatic radicals.

16. A composition according to claim 15 wherein said compound is 2-propene-1-ol, 2-propyne-1-ol, 2-butene-1-ol, and 4-pentene-2-ol.

References Cited

UNITED STATES PATENTS

| 1,151,526 | 8/1915 | Kohman et al. | 99—91 |
| 2,657,143 | 10/1953 | Kass | 99—91 |

RAYMOND N. JONES, Primary Examiner

J. R. HOFFMAN, Assistant Examiner

U.S. Cl. X.R.

99—91